C. L. NOE.
FISHING-ROD REEL.

No. 177,544. Patented May 16, 1876.

WITNESSES:
C. Neveux
John Goethals

INVENTOR:
C. L. Noe
BY Munn
ATTORNEYS.

UNITED STATES PATENT OFFICE.

CHARLES L. NOE, OF BERGEN POINT, NEW JERSEY.

IMPROVEMENT IN FISHING-ROD REELS.

Specification forming part of Letters Patent No. 177,544, dated May 16, 1876; application filed April 4, 1876.

*To all whom it may concern:*

Be it known that I, CHARLES L. NOE, of Bergen Point, Hudson county, New Jersey, have invented a new and Improved Fishing-Reel, of which the following is a specification:

My invention consists of a brake for stopping the overrun of the line after the lead has fallen into the water, composed of a plate fixed on a joint, so as to be borne on the spool by a spring, and having a thumb-lever, by which to hold it off until the moment the lead strikes.

Figure 1:
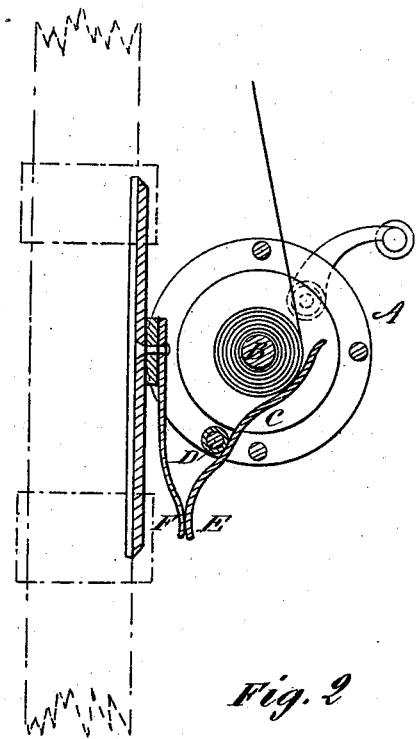
Figure 2:
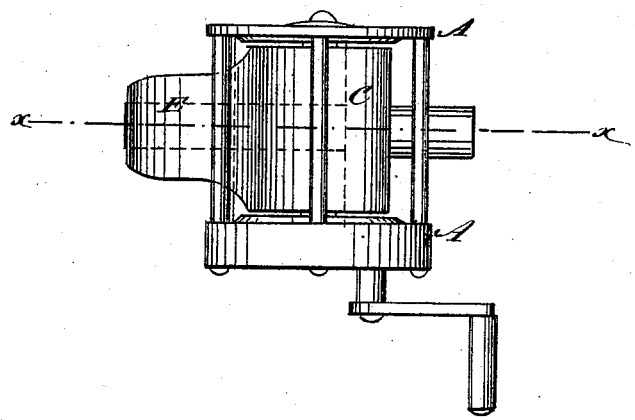

Figure 1 is a sectional elevation of my improved fishing-reel, taken on the line $xx$, Fig. 2, and Fig. 2 is a plan view.

Similar letters of reference indicate corresponding parts.

A represents the cheeks or heads of the reel; B, the shaft, and C the brake-lever, said lever being a plate bearing on the spool between the heads, and being pivoted on the rod D, and having a lever-extension, E, against which the spring F bears, to keep the brake pressed on the line; also for holding it off while the lead is in its flight.

This construction is simpler, and can be operated quicker and easier, than the ordinary reel-brake.

Having thus described my invention, I claim as new and desire to secure by Letters Patent—

The combination, with spool A B, of the plate C, pressing upon the reel itself, pivoted on the rod D, and having an extension, E, supported on spring F, as shown and described, for the purpose specified.

CHARLES L. NOE.

Witnesses:
A. P. THAYER,
ALEX. F. ROBERTS.